(12) United States Patent
Yamashiro et al.

(10) Patent No.: US 9,601,017 B2
(45) Date of Patent: Mar. 21, 2017

(54) RECKLESS-VEHICLE REPORTING APPARATUS, RECKLESS-VEHICLE REPORTING PROGRAM PRODUCT, AND RECKLESS-VEHICLE REPORTING METHOD

(71) Applicant: DENSO CORPORATION, Kariya, Aichi-pref. (JP)

(72) Inventors: Takahisa Yamashiro, Chiryu (JP); Seigou Kumabe, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/782,577

(22) PCT Filed: Apr. 3, 2014

(86) PCT No.: PCT/JP2014/001951
§ 371 (c)(1),
(2) Date: Oct. 5, 2015

(87) PCT Pub. No.: WO2014/167810
PCT Pub. Date: Oct. 16, 2014

(65) Prior Publication Data
US 2016/0042642 A1    Feb. 11, 2016

(30) Foreign Application Priority Data

Apr. 9, 2013 (JP) .................. 2013-081530

(51) Int. Cl.
*G08G 1/16*    (2006.01)
*G08G 1/00*    (2006.01)
(Continued)

(52) U.S. Cl.
CPC ............. *G08G 1/137* (2013.01); *G08G 1/162* (2013.01); *G09B 29/006* (2013.01); *G09B 29/10* (2013.01)

(58) Field of Classification Search
CPC ....... G01S 13/931; G01S 19/42; B60Q 9/008; B60Q 1/525; B60Q 9/003; G08G 1/123;
(Continued)

(56) References Cited

U.S. PATENT DOCUMENTS

2004/0215373 A1* 10/2004 Won ........................ G08G 1/161
701/1
2006/0291482 A1* 12/2006 Evans ................. H04W 40/246
370/401

(Continued)

FOREIGN PATENT DOCUMENTS

JP    2002211265 A    7/2002
JP    2003346287 A    12/2003
(Continued)

OTHER PUBLICATIONS

International Search Report and Written Opinion (in Japanese with English Translation) for PCT/JP2014/001951, mailed Jun. 24, 2014; ISA/JP.

(Continued)

*Primary Examiner* — George Bugg
*Assistant Examiner* — Munear Akki
(74) *Attorney, Agent, or Firm* — Harness, Dickey & Pierce, P.L.C.

(57) ABSTRACT

A reckless-vehicle determination section of a vehicle determines whether a reckless driving operation takes place in each of different vehicles based on determination information from each of the different vehicles. A target different vehicle in which a reckless driving operation is determined to take place is displayed on a display in a display mode that is different from that for any different vehicle in which a reckless driving operation is not determined to take place.

24 Claims, 8 Drawing Sheets

(51) Int. Cl.
*B60Q 1/00* (2006.01)
*G08G 1/123* (2006.01)
*G08G 1/137* (2006.01)
*G09B 29/10* (2006.01)
*G09B 29/00* (2006.01)

(58) Field of Classification Search
CPC .. G08G 1/205; G08G 1/096716; B60K 35/00; G01C 21/26
USPC ............... 340/903–905, 436–438, 988–994; 701/301, 517, 117, 468–469
See application file for complete search history.

(56) References Cited

U.S. PATENT DOCUMENTS

| | | | |
|---|---|---|---|
| 2011/0214178 A1* | 9/2011 | van den Berg | H04L 63/20 726/22 |
| 2012/0108163 A1* | 5/2012 | Bai | H04L 12/1854 455/3.06 |
| 2012/0239286 A1* | 9/2012 | Mizuguchi | G08G 1/162 701/301 |
| 2015/0070193 A1* | 3/2015 | Anschutz | H04W 8/005 340/903 |

FOREIGN PATENT DOCUMENTS

| | | | |
|---|---|---|---|
| JP | 2004077281 A | | 3/2004 |
| JP | 2011129106 A | * | 6/2011 |
| JP | 2011129106 A | | 6/2011 |
| WO | WO-2014167809 A1 | | 10/2014 |

OTHER PUBLICATIONS

Vehicular-Collision Avoidance Support System (VCASS), written by Hatta et al., The Institute of Electronics, Information and Communication Engineers, Technical Report of IEICE, NS2004-203, Feb. 24, 2005, vol. 104 No. 691, pp. 23-28.

* cited by examiner

RECKLESS-VEHICLE REPORTING APPARATUS, RECKLESS-VEHICLE REPORTING PROGRAM PRODUCT, AND RECKLESS-VEHICLE REPORTING METHOD

CROSS REFERENCE TO RELATED APPLICATIONS

This application is a U.S. National Phase Application under 35 U.S.C. 371 of International Application No. PCT/JP2014/001951 filed on Apr. 3, 2014 and published in Japanese as WO 2014/167810 A1 on Oct. 16, 2014. This application is based on and claims the benefit of priority from Japanese Patent Application No. 2013-081530 filed on Apr. 9, 2013. The entire disclosures of all of the above applications are incorporated herein by reference.

TECHNICAL FIELD

The present disclosure relates to a technology that uses inter-vehicle communication to notify a driver of other reckless vehicles around a driver's vehicle.

BACKGROUND ART

The prior art technology as disclosed in patent literature 1 uses inter-vehicle communication to acquire a position or a travel direction of a vehicle (namely a nearby vehicle) existing around a vehicle and display the position or the travel direction so as to overlap with a map image.

PRIOR ART LITERATURES

Patent Literature

Patent Literature 1: JP 2004-077281 A

SUMMARY OF INVENTION

However, the technology disclosed in patent literature 1 just displays the position or the travel direction of the nearby vehicle and cannot report whether a driver of the nearby vehicle drives the nearby vehicle safely or recklessly. The driver can take action such as keeping an inter-vehicular distance longer than normal if he or she can know that the nearby vehicle indicates reckless driving.

It is an object of the present disclosure to provide a reckless-vehicle reporting apparatus that can report to a driver of a vehicle whether a nearby vehicle is driven recklessly, a program product for reporting reckless vehicles, and a method for reporting reckless vehicles.

To achieve the object, according to a first example of the present disclosure, a reckless-vehicle reporting apparatus is provided as follows. The reckless-vehicle reporting apparatus is mounted in a vehicle and wirelessly communicates data with a different reckless-vehicle reporting apparatus in each of a plurality of different vehicles different from the vehicle. The different reckless-vehicle reporting apparatus is identical to the reckless-vehicle reporting apparatus in function. The reckless-vehicle reporting apparatus includes a position detection unit that detects a position of the vehicle, and an in-vehicle communicator that transmits a position data indicating a position of the vehicle and receives a position data indicating a position of each of the different vehicles. Further, the reckless-vehicle reporting apparatus includes (i) a mark display processor that displays a mark indicating the position of each of the different vehicles on a display based on the received position data of each of the different vehicles; (ii) a determination information acquisition section that acquires determination information that is used to determine whether a reckless driving operation takes place in the vehicle or not; (iii) a transmission control section that transmits the determination information acquired by the determination information acquisition section via the in-vehicle communicator; (iv) a reception control section that receives determination information from each of the different vehicles via the in-vehicle communicator, the determination information received from each of the different vehicles being used to determine whether a reckless driving operation takes place in each of the different vehicles or not; and (v) a reckless-vehicle determination section that determines whether a reckless driving operation takes place in each of the different vehicles based on the determination information of each of the different vehicles received by the reception control section. Furthermore, the reckless-vehicle reporting apparatus includes a reckless-vehicle display processor that displays the mark indicating the position of a target different vehicle in a first display mode. The target different vehicle is the different vehicle in which the reckless driving operation is determined to take place by the reckless-vehicle determination section. The first display mode is different from a second display mode that is used for the mark indicating the position of each of the different vehicles in which the reckless driving operation is not determined to take place.

According to the configuration, the reckless-vehicle determination section of the reckless-vehicle reporting apparatus mounted on a vehicle determines whether or not a different vehicle indicates reckless driving, based on determination information, which is about the different vehicle and transmitted from the different vehicle. When a target different vehicle is determined to indicate reckless driving, the target different vehicle is displayed on a display in a display mode (display form) different from a display mode used for a different vehicle that is not determined to indicate reckless driving. Viewing the display, a driver of a vehicle can identify whether or not a different vehicle traveling around the vehicle indicates reckless driving. The driver of the vehicle can be notified whether or not a nearby vehicle indicates reckless driving.

In addition, according to a second example of the present disclosure, a reckless-vehicle reporting program product is provided as follows. That is, the product is stored in a non-transitory computer-readable medium. The product includes instructions to cause a computer to function as the determination information acquisition section, the transmission control section, the reception control section, the mark display processor, the reckless-vehicle determination section, and the reckless-vehicle display processor, all of which are included in the reckless-vehicle reporting apparatus according to the above first example.

Furthermore, according to a third example of the present disclosure, a reckless-vehicle reporting method is provided as follows. That is, the method is executed by a computer to achieve functions as the determination information acquisition section, the transmission control section, the reception control section, the mark display processor, the reckless-vehicle determination section, and the reckless-vehicle display processor, all of which are included in the reckless-vehicle reporting apparatus according to the above first example.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Figure 1:
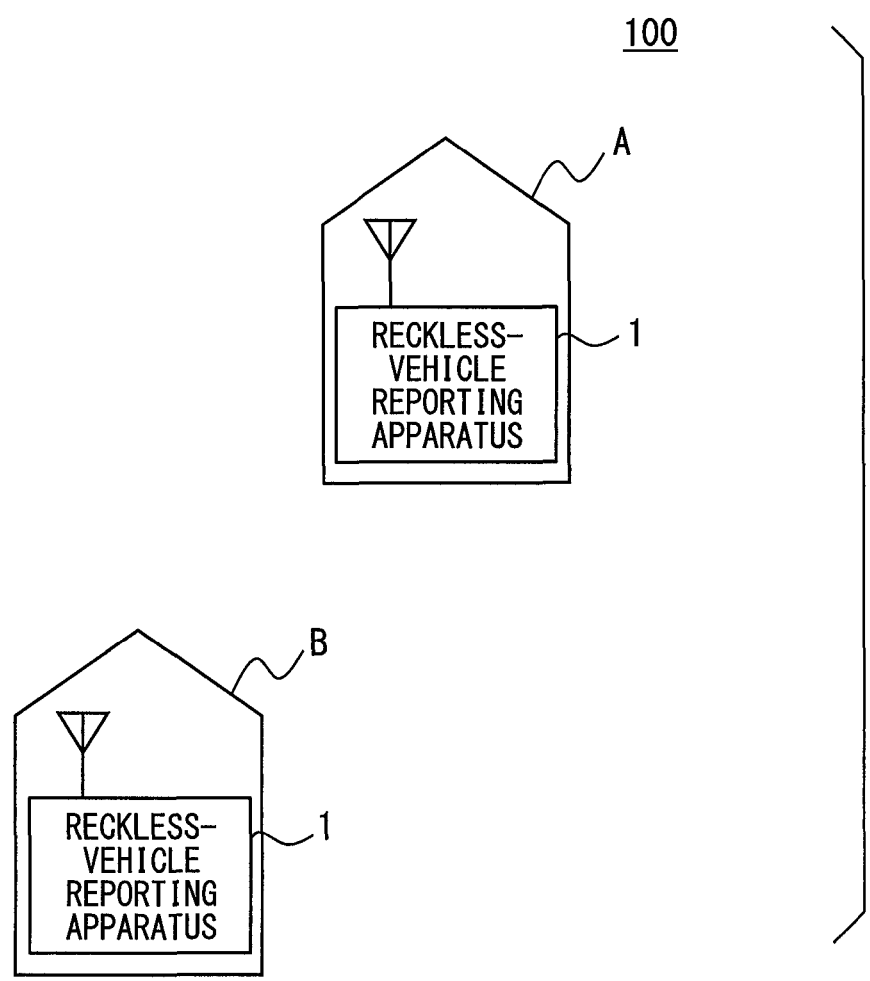
FIG. 1 is a diagram illustrating a schematic configuration of a reckless-vehicle reporting system using a reckless-vehicle reporting apparatus according to an embodiment of the disclosure.

An embodiment of the disclosure will be described with reference to FIGS. 1 through 10. FIG. 1 is a diagram illustrating a schematic configuration of an inter-vehicle communication system (hereinafter referred to as a reckless vehicle reporting system) 100 using a reckless-vehicle reporting apparatus 1 according to the disclosure. The reckless vehicle reporting system 100 includes the reckless-vehicle reporting apparatus 1 that is used based on one-to-one correspondence to each of several vehicles. The several vehicles include vehicle A and at least two or more vehicles B though unshown in FIG. 1. Vehicle A is also referred to as a subject vehicle or simply a vehicle. Vehicle B is also referred to as a different vehicle. The relationship between the subject vehicle and the different vehicle is relative. Suppose that one vehicle B is the subject vehicle. Then, vehicle A is the different vehicle against vehicle B. A vehicle mounted with an apparatus is also referred to as a host vehicle for the apparatus.

Figure 2:
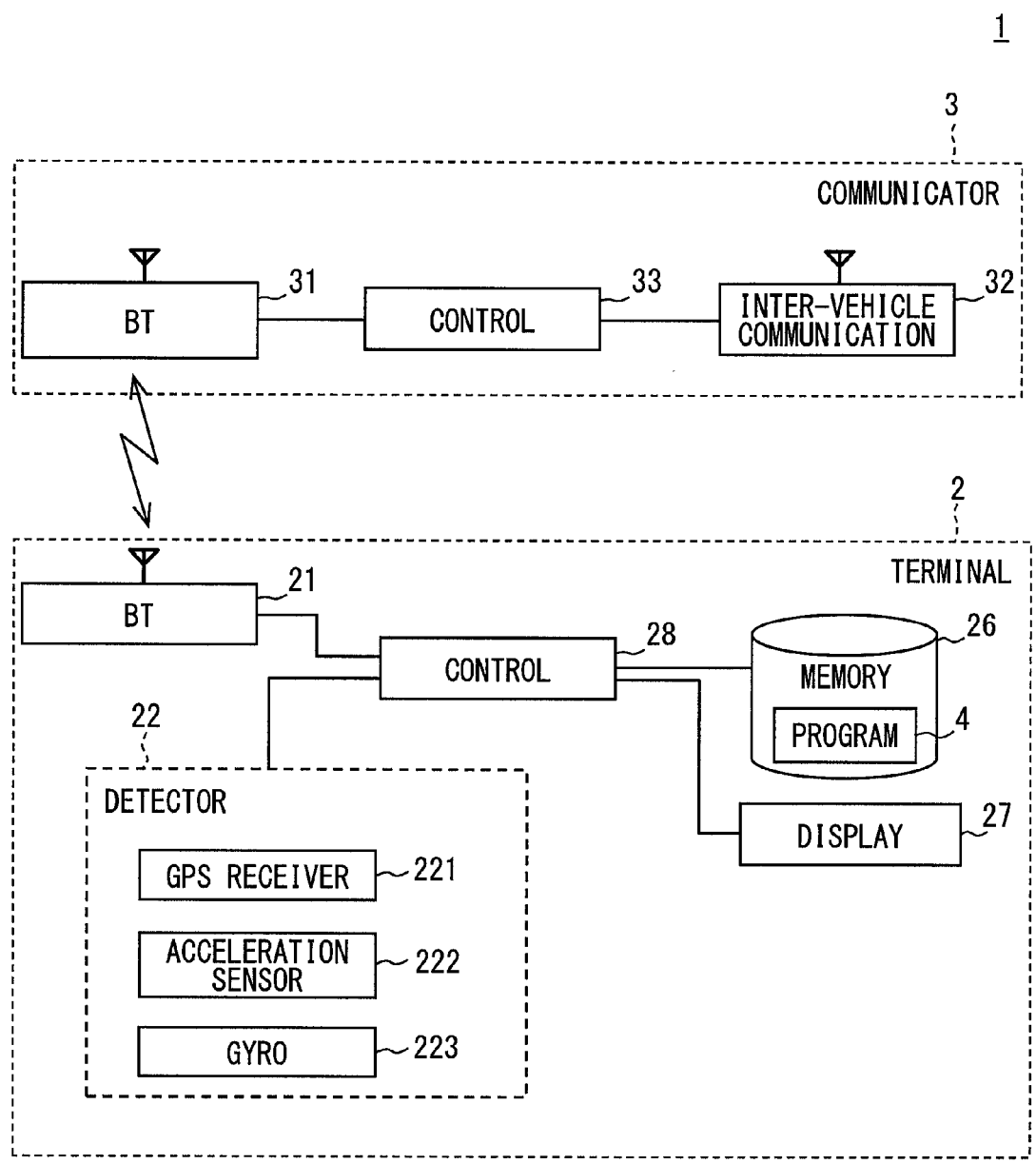
FIG. 2 is a diagram illustrating a schematic configuration of the reckless-vehicle reporting apparatus.

The following describes a schematic configuration of the reckless-vehicle reporting apparatus 1 with reference to FIG. 2. FIG. 2 is a diagram illustrating a schematic configuration of the reckless-vehicle reporting apparatus 1. As illustrated in FIG. 2, the reckless-vehicle reporting apparatus 1 includes a portable terminal 2 and a communicator 3.

The portable terminal 2 acquires data to be transmitted to a different vehicle (hereinafter simply referred to as the nearby vehicle) existing in an area around the subject vehicle mounted with the portable terminal 2. The portable terminal 2 also reports data received from the nearby vehicle to a driver of the subject vehicle using a display 27. The area around the subject vehicle signifies a range in which the communicator 3 (to be described) is capable of wireless communication. The portable terminal 2 may be available as a multi-functional mobile telephone such as a publicly known smartphone. The portable terminal 2 is temporarily fixed in a vehicle compartment so that the subject vehicle's driver can visually check the display 27 of the portable terminal 2. More favorably, the embodiment previously provides the portable terminal 2 with installation disposition (orientation of the portable terminal 2 with reference to a front-back direction of the subject vehicle or an angle of the terminal with reference to a horizontal plane) of the portable terminal 2 with reference to the subject vehicle. The portable terminal 2 is installed at a position corresponding to the installation disposition. For example, the portable terminal 2 is installed so that the display 27 is oriented to a driver's seat at 110 degrees with reference to the horizontal plane and a mapping component of the portable terminal 2 in a vertical direction on the horizontal plane corresponds to the front-back direction of the subject vehicle. The installation disposition of the portable terminal 2 in relation to the vehicle is not limited thereto. A driver is allowed to configure the installation disposition.

To provide a function as the above device, the portable terminal 2 includes an in-terminal Bluetooth (registered trademark, hereinafter abbreviated as BT) communication unit 21, a detector 22, memory 26, the display 27, and an in-terminal control circuit 28.

To exchange information, the in-terminal BT communication unit 21 includes a transmitting and receiving antenna and performs Bluetooth-compliant communication (hereinafter referred to as BT communication) with the communicator 3 of the subject vehicle. The embodiment uses the BT communication as communication between the portable terminal 2 and the communicator 3 but is not limited thereto. The communication may be configured to be wireless or wired. The wireless communication may comply with a short-range communication standard such as ZigBee (registered trademark) or a wireless LAN standard such as IEEE802.11. The wired communication may be available as USB communication. The in-terminal BT communication unit 21 is also referred to as a different communication unit or an additional communication unit.

The detector 22 acquires various types of data to generate information used to determine whether or not the subject vehicle is driven safely. According to the embodiment, the detector 22 includes a GPS receiver 221, an acceleration sensor 222, and a gyro sensor 223. The GPS receiver 221 receives a radio wave from a GPS (Global Positioning System) satellite. The acceleration sensor 222 detects an acceleration acting on the terminal. The gyro sensor 223 detects an angular velocity or an angle acting on the terminal.

The memory 26 is provided as electrically rewritable, nonvolatile memory. The memory 26 stores map data for route guidance and a program 4 that allows a portable terminal such as a publicly known multi-functional mobile telephone to operate as the portable terminal 2 according to the embodiment. The memory 26 may be available as a removable storage medium such as an SD card that can be removed from the portable terminal 2. The memory 26 does not erase saved data unless a vehicle driver explicitly issues an instruction to erase the data. The program 4 that allows a publicly known portable terminal to operate as the portable terminal 2 according to the embodiment may be installed in a storage area of ROM included in the in-terminal control circuit 28 (to be described later). The program 4 may be also referred to as a reckless-vehicle reporting program product.

The display 27 displays text or an image based on a signal input from the in-terminal control circuit 28. The display 27 is capable of full-color display and can use a TFT liquid crystal display or an organic EL display.

The in-terminal control circuit 28 is configured as an ordinary computer and internally contains a widely known CPU; memory devices such as ROM, RAM, EEPROM; an I/O device; and a bus line connecting these components (none illustrated). The in-terminal control circuit 28 performs various processes based on various types of information input from the in-terminal BT communication unit 21 and the detector 22 while the CPU executes a program previously stored in ROM or the memory 26. The in-terminal control circuit 28 may be configured as hardware such as one or more IC devices.

Figure 3:
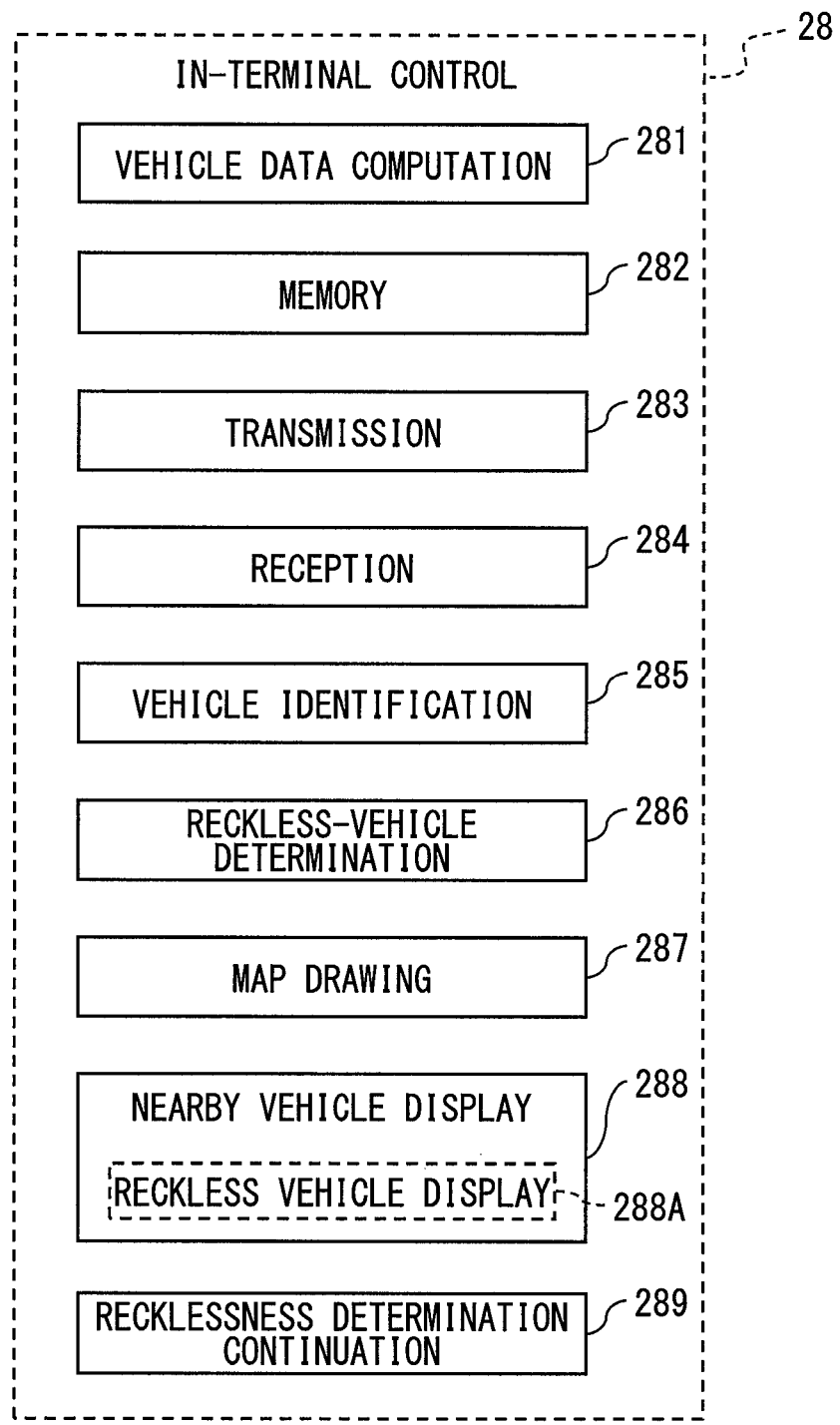
FIG. 3 is a function block diagram illustrating a schematic configuration of an in-terminal control circuit according to the embodiment.

As illustrated in FIG. 3, the in-terminal control circuit 28 includes function blocks to process data to be transmitted to the nearby vehicle. The function blocks include a vehicle data computation unit 281, internal memory 282, and a transmission control section 283. The in-terminal control circuit 28 includes function blocks to process data received from the nearby vehicle. The function blocks include a reception control section 284, a vehicle identification section 285, a reckless-vehicle determination section 286, a map image drawing section 287, a nearby vehicle display section 288, and a recklessness determination continuation section 289. The internal memory 282 is provided as electrically rewritable memory such as RAM or EEPROM. For convenience sake, the following omits the description of functions that are included in an ordinary multi-functional mobile telephone but are unnecessary for the description of the disclosure.

Figure 4:
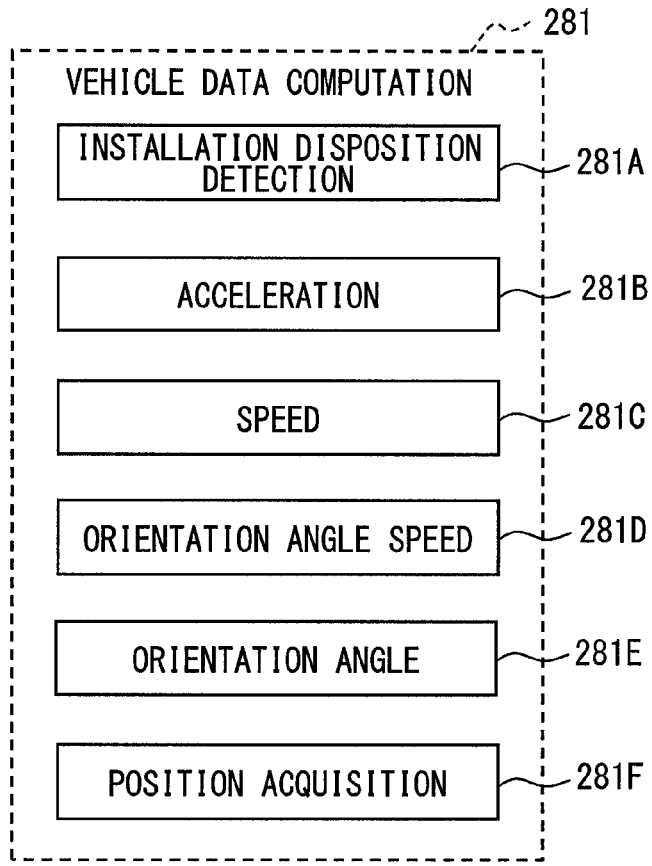
FIG. 4 is a function block diagram illustrating a schematic configuration of a vehicle data computation unit.

The vehicle data computation unit 281 computes various data (vehicle data) concerning a travel state of the subject vehicle from various sensor data successively detected by the detector 22 and stores the data in the internal memory 282. The vehicle data computed by the vehicle data computation unit 281 includes a position of the portable terminal 2 (namely, a position of the subject vehicle), a travel speed of the subject vehicle, acceleration acting on the subject vehicle, a travel direction (hereinafter referred to as an orientation angle) of the subject vehicle, and an orientation angle speed. The embodiment does not necessarily need all these types of data. At least one of the data may be contained in order to acquire data to determine whether or not the driving is safe. For example, the vehicle data may include only the position and the acceleration of the subject vehicle. The vehicle data computation unit 281 includes function blocks to acquire the vehicle data as illustrated in FIG. 4. The function blocks include an installation disposition detection unit 281A, an acceleration computation unit 281B, a speed computation unit 281C, an orientation angle speed computation unit 281D, an orientation angle computation unit 281E, and a position acquisition unit 281F. The vehicle data computation unit 281 can also function as a determination information acquisition section. The vehicle data is also referred to as determination information.

The installation disposition detection unit 281A detects an installation disposition of the portable terminal 2 with reference to the subject vehicle. The embodiment uses a predetermined value for the installation disposition with reference to the subject vehicle but is not limited thereto. When the portable terminal 2 includes the acceleration sensor 222 and the gyro sensor 223, the installation disposition detection unit 281A can use a publicly known technology to detect the terminal's orientation or tilt against the horizontal plane from the sensor data. The installation disposition detection unit 281A detects a front-back direction of the subject vehicle from chronological data about subject vehicle positions computed by the position acquisition unit 281F (to be described) to compute the terminal orientation with reference to the front-back direction. To detect the front-back direction of the subject vehicle, the installation disposition detection unit 281A detects a straight-road interval to travel using chronological data about subject vehicle positions computed by the position acquisition unit 281F and assumes the direction of movement to travel the straight-road interval to be the front-back direction of the subject vehicle. The installation disposition detection unit 281A detects an installation disposition of the portable terminal 2 with reference to the subject vehicle. Consequently, the installation disposition detection unit 281A can find the acceleration acting on the front-back direction of the subject vehicle using a sensor value such as the acceleration acting on the terminal.

The acceleration computation unit 281B successively computes a component of the acceleration (hereinafter simply assumed to be the acceleration) acting on the terminal corresponding to the front-back direction of the subject vehicle from the installation disposition detected by the installation disposition detection unit 281A. A positive value is used to express the acceleration generated in a travel direction. A negative value is used to express the acceleration in a deceleration direction. The embodiment computes only a component of the acceleration acting on the terminal corresponding to the front-back direction of the subject vehicle. The embodiment may additionally compute a component of the acceleration acting on the terminal corresponding to a vehicle width direction. The acceleration computation unit 281B can be referred to as an acceleration acquisition unit.

The speed computation unit 281C successively computes a travel speed of the subject vehicle by integrating the acceleration in the vehicle's front-back direction computed by the acceleration computation unit 281B. The speed computation unit 281C is also referred to as a travel speed acquisition unit. The orientation angle speed computation unit 281D successively computes an orientation angle speed (rad/sec) acting on the subject vehicle based on the installation disposition detected by the installation disposition detection unit 281A and a change in the angular velocity detected by the gyro sensor 223. The orientation angle speed computation unit 281D is also referred to as an orientation angle speed acquisition unit. The orientation angle computation unit 281E computes a change in the terminal angle by integrating the angular velocity detected by the gyro sensor 223. The orientation angle computation unit 281E further computes an orientation angle (rad) of the subject vehicle based on the relative relationship between the terminal orientation detected by the installation disposition detection unit 281A and the subject vehicle orientation.

The position acquisition unit 281F successively detects the subject vehicle position based on information acquired from the sensors including the acceleration sensor 222 and the gyro sensor 223 in addition to the information about the subject vehicle position received by the GPS receiver 221. The sensors are prone to errors of different properties and are therefore configured to complement each other to detect the subject vehicle position. Part of the sensors may be used depending on accuracies of the sensors. A sensor other than the ones mentioned above may be used. The position acquisition unit 281F may use only the GPS receiver 221 to detect the subject vehicle position. The subject vehicle position is expressed in the latitude and the longitude. The position acquisition unit 281F or GPS receiver 221 is also referred to as a position detection unit.

The method of computing values such as the acceleration is not limited to the one described above. The speed computation unit 281C can compute the travel speed by computing a travel distance per unit time based on chronologically marked main vehicle positions. The acceleration computation unit 281B can process the acceleration corresponding to a value resulting from temporal differentiation of the successively computed travel speed.

The orientation angle computation unit 281E can find an orientation angle by computing a direction of an approximate line found by the least-square method based on chronologically marked positions. The portable terminal 2 may include a geomagnetic sensor and may be able to use a detection result from the geomagnetic sensor. In such a case, the orientation angle computation unit 281E can find an orientation angle of the subject vehicle using a detection result from the geomagnetic sensor. The orientation angle speed computation unit 281D may find an orientation angle speed using temporal differentiation of an orientation angle successively computed by the orientation angle computation unit 281E.

The vehicle data computed by vehicle data computation unit 281 is given information (time stamp) about the time of the computation and is stored in the internal memory 282. Storing new data in the internal memory 282 may exceed the allocated memory capacity. In such a case, data already stored in the internal memory 282 may be erased from the earliest data. Alternatively, stored vehicle data may be erased when the data continues to be stored over a specified time period.

The transmission control section 283 provides control to transmit vehicle data stored in the internal memory 282 to the communicator 3 via the in-terminal BT communication unit 21. The transmission control section 283 reads vehicle data stored in the internal memory 282 when receiving an acquisition request to acquire information about the subject vehicle from the communicator 3 of the subject vehicle via the in-terminal BT communication unit 21. The transmission control section 283 transmits the read vehicle data to the communicator 3 via the in-terminal BT communication unit 21. Basically, the transmission control section 283 reads the most recent data (corresponding to the newest time stamp). Further, the transmission control section 283 may read and transmit vehicle data corresponding to several time points in the past from the most recent vehicle data. As will be described in detail later, an inter-vehicle transmission control section 331 transmits vehicle data to a nearby vehicle while the vehicle data is assumed to be vehicle information provided with an identification ID to identify the vehicle.

The communicator 3 of the subject vehicle receives the vehicle information about the nearby vehicle from the nearby vehicle. The reception control section 284 receives the vehicle information about the nearby vehicle via the in-terminal BT communication unit 21. Similarly to the vehicle information about the subject vehicle, the vehicle information about the nearby vehicle includes an identification ID, a vehicle position, an orientation angle, a travel speed, an acceleration, and an orientation angle speed.

The vehicle identification section 285 determines whether or not the vehicle information about the nearby vehicle is transmitted from the same vehicle or a different vehicle, based on the identification ID contained in the vehicle information about the nearby vehicle. The vehicle identification section 285 classifies the vehicle information according to vehicles and stores the vehicle information in the internal memory 282.

Based on the vehicle information about the nearby vehicle, the reckless-vehicle determination section 286 checks each nearby vehicle to determine whether or not the nearby vehicle (hereinafter referred to as a reckless vehicle) indicates reckless driving. A process to determine whether or not the nearby vehicle is a reckless vehicle will be described in detail later.

The map image drawing section 287 reads map data near the current subject vehicle position from the memory 26 and draws a map image so that the subject vehicle is displayed at the center of a screen. The range of map data read from the memory 26 depends on the current subject vehicle position and the display scale predetermined for a map image.

The nearby vehicle display section 288 draws a mark representing the position and the orientation angle identified by the vehicle identification section 285 for each nearby vehicle. The mark is drawn so as to overlap with the map image drawn by the map image drawing section 287. A nearby vehicle determined to be a reckless vehicle by the reckless-vehicle determination section 286 is displayed with a mark whose display mode (display form) such as color or shape differs from that of a vehicle (hereinafter referred to as a normal vehicle) not determined to be a reckless vehicle. The purpose is to make a distinction between the reckless vehicle and the normal vehicle. The display mode to distinguish the reckless vehicle from the normal vehicle can use colors, shapes, blinking, a variation of colors, text, and a combination of these. A mark representing the reckless vehicle is displayed nearer to the driver than the normal vehicle. This enables to display marks for reckless vehicles without hiding the marks even if marks for nearby vehicles are densely displayed to overlap.

The mark representing the vehicle position of each nearby vehicle is moved each time the vehicle information about each nearby vehicle is received and the vehicle position is updated. For convenience sake, the embodiment provides a function to display reckless vehicles as a reckless vehicle display section 288A. The nearby vehicle display section 288 is also referred to as a mark display processor. The reckless vehicle display section 288A is also referred to as a reckless vehicle display processor.

When the reckless-vehicle determination section 286 determines the nearby vehicle to be a reckless vehicle, the recklessness determination continuation section 289 continues to determine the nearby vehicle to be a reckless vehicle while performing inter-vehicle communication with the nearby vehicle. This is because a vehicle having experience in reckless driving operation is highly likely to repeat reckless driving operation even if the vehicle temporarily ceases the reckless driving operation. The recklessness determination continuation section 289 can allow a driver of subject vehicle A to identify a vehicle that is highly likely to repeat reckless driving operation though the vehicle is not performing reckless driving operation at the present. A reckless vehicle determination process (to be described) is not performed on a vehicle once determined to be a reckless vehicle while the recklessness determination continuation section 289 continues to determine that the vehicle is a reckless vehicle.

A condition to return the reckless vehicle to the normal vehicle is satisfied when the reckless vehicle exits from a range capable of wireless communication with the subject vehicle and the vehicle information from the reckless vehicle cannot be received for a specified time period (e.g., 30 seconds) or longer. Another embodiment may return the reckless vehicle to the normal vehicle when a specified time period (e.g., one minute) elapses after the vehicle is determined to be a reckless vehicle.

Returning to FIG. 2, the communicator 3 exchanges information with the communicator 3 of the nearby vehicle based on inter-vehicle communication. The communicator 3 is not limited to being mounted on a vehicle. The communicator 3 may be portable and may be carried by a driver into the vehicle. The communicator 3 includes an in-communicator BT communication unit 31, an inter-vehicle communication unit 32, and an in-communicator control circuit 33. The communicator 3 is also referred to as an in-vehicle communicator.

The in-communicator BT communication unit 31 includes a transmitting and receiving antenna and performs BT communication with the portable terminal 2 of the subject vehicle to exchange information. The in-communicator BT communication unit 31 is also referred to as a different communication unit or an additional communication unit.

The inter-vehicle communication unit 32 includes a transmitting and receiving antenna and performs inter-vehicle communication with the communicator 3 of the nearby vehicle to exchange information based on wireless communication without using a telephone network. A range to perform the inter-vehicle communication depends on frequency bands used for the wireless communication. When the wireless communication uses a radio wave in 700 MHz band, the inter-vehicle communication is performed with the communicator 3 of the nearby vehicle existing within a radius of approximately one kilometer around the subject vehicle as a center. When the wireless communication uses a radio wave in 5.9 GHz band, the inter-vehicle communication is performed with the communicator 3 of the nearby vehicle existing within a radius of approximately 500 meters around the subject vehicle as a center. The inter-vehicle communication unit 32 transmits information on a transmission cycle (e.g., 100 milliseconds) according to an instruction from the in-communicator control circuit 33.

The in-communicator control circuit 33 is configured as an ordinary computer and internally contains a widely known CPU; memory devices such as ROM, RAM, EEPROM; an I/O device; and a bus line connecting these components (none illustrated). The in-communicator control circuit 33 performs various processes based on various types of information input from the in-communicator BT communication unit 31 and the inter-vehicle communication unit 32 while the CPU executes a program previously stored in the ROM. The in-communicator control circuit 33 may be configured as hardware such as one or more IC devices.

Figure 5:
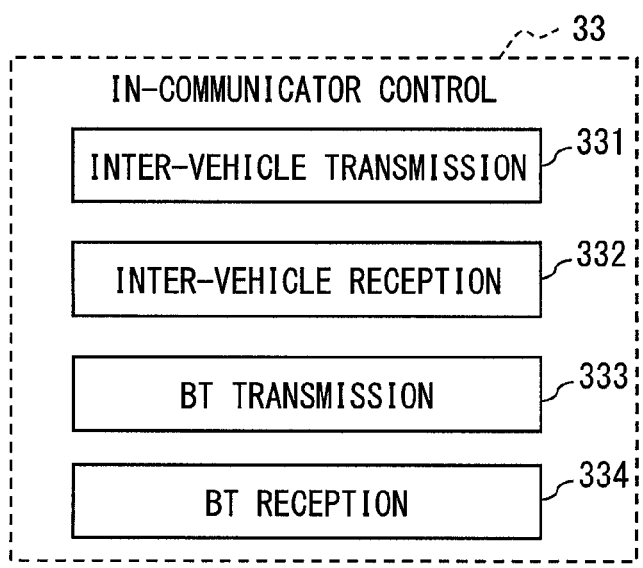
FIG. 5 is a function block diagram illustrating a schematic configuration of an in-communicator control circuit according to the embodiment.

As illustrated in FIG. 5, the in-communicator control circuit 33 includes function blocks such as an inter-vehicle transmission control section 331, an inter-vehicle reception control section 332, a BT transmission control section 333, and a BT reception control section 334.

The BT reception control section 334 receives vehicle data transmitted from the portable terminal 2 via the in-communicator BT communication unit 31. The inter-vehicle transmission control section 331 generates vehicle information about the subject vehicle from the vehicle data received by the BT reception control section 334 and transmits the vehicle information via the inter-vehicle communication unit 32.

The inter-vehicle reception control section 332 receives vehicle information about the nearby vehicle transmitted from the communicator 3 of the nearby vehicle via the inter-vehicle communication unit 32. The BT transmission control section 333 transmits the vehicle information received by the inter-vehicle reception control section 332 to the portable terminal 2 of the subject vehicle via the in-communicator BT communication unit 31.

Figure 6:
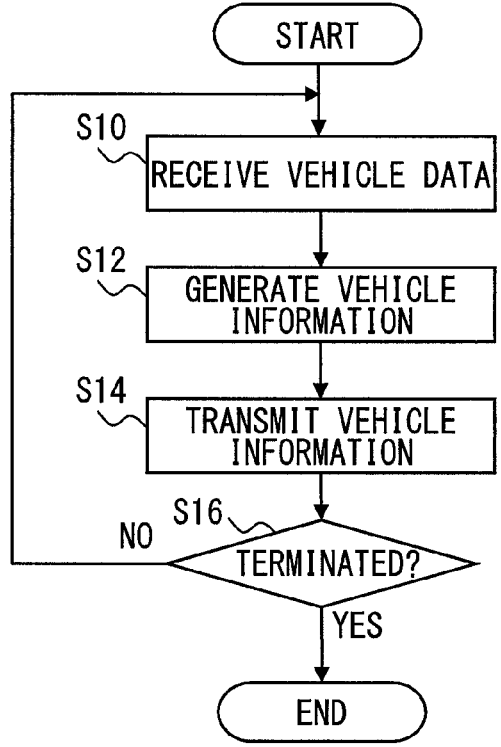
FIG. 6 is a flowchart illustrating a vehicle information transmission process.

With reference to a flowchart in FIG. 6, the following describes a vehicle information transmission process the in-communicator control circuit 33 of the communicator 3 performs to transmit the subject vehicle information to the nearby vehicle.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device or module. Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

The flowchart in FIG. 6 can start when the communicator 3 and the portable terminal 2 are powered on.

At S10, the BT reception control section 334 receives vehicle data and proceeds to S12. During the vehicle data reception process at S10, the BT reception control section 334 transmits an acquisition request for vehicle data to the portable terminal 2 via the in-communicator BT communication unit 31. In response to the acquisition request, the BT reception control section 334 receives vehicle data returned from the portable terminal 2 via the in-communicator BT communication unit 31.

According to the embodiment, the communicator 3 transmits an acquisition request for vehicle data to the portable terminal 2. The BT reception control section 334 receives the vehicle data returned in response to the acquisition request. However, the embodiment is not limited thereto. The portable terminal 2 may transmit the most recent vehicle data stored in the internal memory 282 at a specified time interval. The BT reception control section 334 may successively receive the transmitted vehicle data.

At S12, the inter-vehicle transmission control section 331 performs a vehicle information generation process and proceeds to S14. The vehicle information generation process at S12 supplies the vehicle data received by the BT reception control section 334 with an identification number to identify a vehicle and generates vehicle information to be transmitted during the inter-vehicle communication. As the identification number, the embodiment uses a device ID uniquely assigned to the communicator 3, but is not limited thereto. The identification number may be available as a vehicle ID assigned to each vehicle or a portable terminal ID (e.g., product number) assigned to the portable terminal 2 as well as the device ID.

According to the embodiment, the portable terminal 2 generates vehicle data. The inter-vehicle transmission control section 331 performs the process to supply the subject vehicle information with the device ID. However, the embodiment is not limited thereto. The inter-vehicle transmission control section 331 may receive sensor values from various sensors included in the portable terminal 2. The inter-vehicle transmission control section 331 may generate the subject vehicle information based on the sensor values. The communicator 3 may include at least a satellite positioning system receiver such as the GPS receiver 221. The receiver can detect a position of the communicator 3 for the subject vehicle. In such a case, the subject vehicle information may be generated based on the detected position. An orientation angle of the subject vehicle may be computed based on the position of the communicator 3 for the subject vehicle using the same method as that used to compute an orientation angle from chronological data for subject vehicle positions. The communicator 3 may be connected to a yaw rate sensor or a vehicle speed sensor (none illustrated) included in the subject vehicle via a CAN bus and may be able do acquire sensor values from the various sensors. In such a case, the vehicle information may be generated based on the sensor values.

At S14, the inter-vehicle transmission control section 331 performs a vehicle information transmission process and proceeds to S16. The vehicle information transmission process at S14 transmits the vehicle information about the subject vehicle generated by the vehicle information generation process to the nearby vehicle via the inter-vehicle communication unit. The vehicle information transmission process transmits the vehicle information on a cycle such as 100 ms in accordance with the transmission cycle of the inter-vehicle communication on the communicator 3.

The vehicle information transmission process terminates the flow if the vehicle information transmission process reaches termination timing at S16 (S16 YES). The vehicle information transmission process returns to S10 and repeats the flow if the vehicle information transmission process does not reach the termination timing at S16 (S16 NO). An example of the timing to terminate the vehicle information transmission process is to power off at least one of the communicator 3 and the portable terminal 2.

Figure 7:
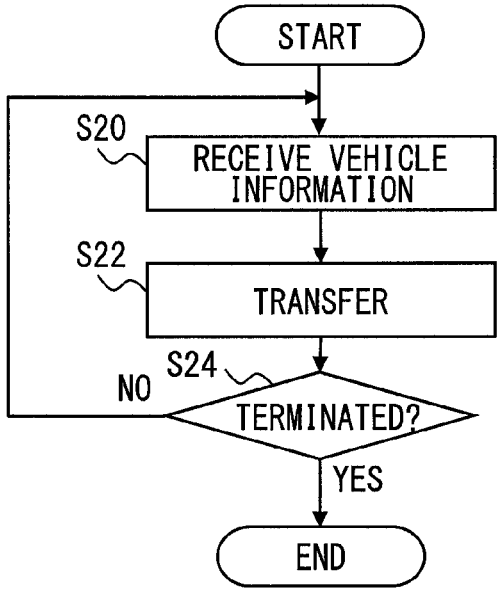
FIG. 7 is a flowchart illustrating a vehicle information reception process.

With reference to a flowchart in FIG. 7, the following describes a vehicle information reception process the in-communicator control circuit 33 of the communicator 3 performs to receive the nearby vehicle information. Similarly to the vehicle information transmission process in FIG. 6, the flowchart in FIG. 7 can start when the communicator 3 and the portable terminal 2 are powered on.

At S20, the inter-vehicle reception control section 332 performs the vehicle information reception process and proceeds to S22. The vehicle information reception process at S20 receives vehicle information transmitted from the nearby vehicle via the inter-vehicle communication unit. The nearby vehicle information is received successively.

At S22, the BT transmission control section 333 performs a transfer process and proceeds to S24. The transfer process at S22 transmits the nearby vehicle information to the portable terminal 2 via the in-communicator BT communication unit 31. The vehicle information received at S20 is successively transferred to the portable terminal 2 at S22. However, the configuration is not limited thereto. A specified transfer cycle (100 milliseconds) may be defined. The nearby vehicle information received during this cycle may be transferred at a time.

The vehicle information reception process terminates the flow if the vehicle information reception process reaches termination timing at S24 (S24 YES). The vehicle information reception process returns to S20 and repeats the flow if the vehicle information reception process does not reach the termination timing at S24 (S24 NO). An example of the timing to terminate the vehicle information reception process is to power off at least one of the communicator 3 and the portable terminal 2.

Figure 8:
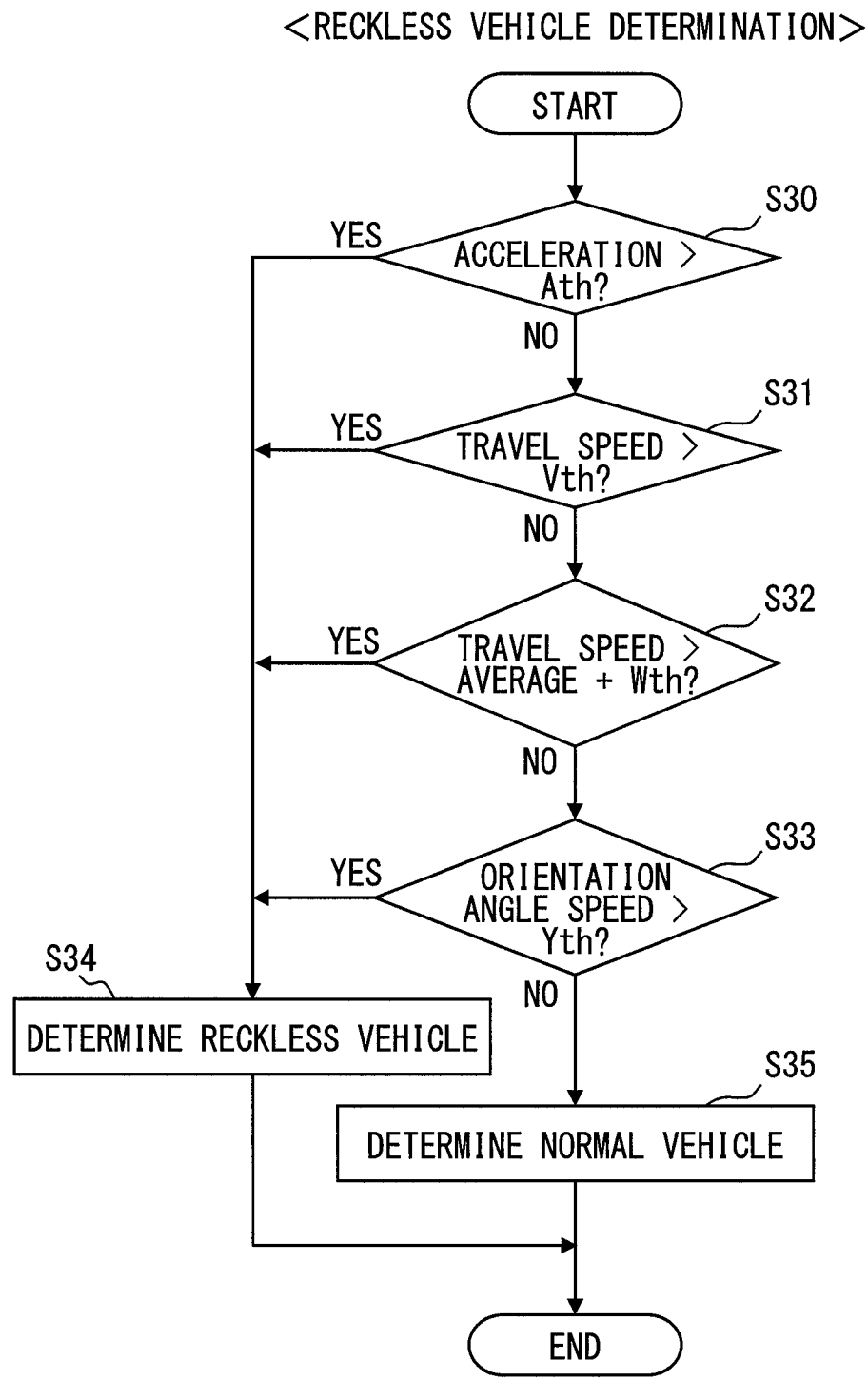
FIG. 8 is a flowchart illustrating a reckless vehicle determination process.

With reference to a flowchart in FIG. 8, the following describes a reckless vehicle determination process the reckless-vehicle determination section 286 performs to determine whether or not the nearby vehicle is a reckless vehicle. The process corresponding to the flowchart in FIG. 8 is performed on each nearby vehicle when the nearby vehicle information is received. For convenience sake, a nearby vehicle targeted at the reckless vehicle determination process is referred to as a target vehicle or another target vehicle to be distinguished from the other nearby vehicles.

At S30, the process determines whether or not the acceleration contained in the target vehicle information is greater than specified threshold value Ath. Threshold value Ath is defined as 0.6 G assuming that 1G=9.81 m/sec/sec. Threshold value Ath may be set to another value (e.g., 0.5 G) and may be found as the vehicle acceleration assumed to be dangerous from observation data in the past. Different threshold values Ath may be provided for vehicle types if a vehicle type can be acquired from the vehicle information. Threshold value Ath may be set to 0.6 G for a passenger car, 0.7 G for a van, 0.5 G for a truck carrying a load of less than 4 tons, and 0.45 G for a truck or a bus carrying a load ranging from 4 to 10 tons. These values may be appropriately designed. The process results in YES at S30 and proceeds to S34 if the target vehicle acceleration is greater than threshold value Ath at S30. The process results in NO at S30 and proceeds to S31 if the target vehicle acceleration is smaller than or equal to threshold value Ath.

At S31, the process determines whether or not a travel speed of the target vehicle is greater than specified threshold value Vth. Threshold value Vth may correspond to a legal speed for a road the target vehicle is traveling. The type of a road the target vehicle is traveling is acquired from map data stored in the memory 26. The legal speed can be determined according to the road type. The process results in YES at S31 and proceeds to S34 if the travel speed of the target vehicle is greater than Vth at S31. The process results in NO at S31 and proceeds to S32 if the travel speed of the target vehicle is smaller than or equal to threshold value Vth.

At S32, the process determines whether or not the travel speed of the target vehicle is greater than the sum of an average value (an average travel speed or an average speed) of travel speeds of other nearby vehicles traveling around (mainly forward and backward of) the target vehicle and a specified threshold value (Wth). Threshold value Wth may be set to 10 km/h as an example. Threshold value Wth may be set to other values such as 5 km/h or may be set a value depending on the average speed (such as 20% of the average speed).

Another vehicle traveling around the target vehicle is defined as being existent within 50 m from the target vehicle in the front-back direction and having an orientation angle that causes a difference (orientation angle difference) of within ±10 degrees from the orientation angle of the target vehicle. The range around the target vehicle in the front-back direction is not limited to 50 m. The distance may be proportional to a travel speed of the target vehicle. The orientation angle condition is provided in consideration of the following. At an intersection, a stopping vehicle and a traveling vehicle are present concurrently. An improper average speed is computed if all the vehicles are assumed to be a population. To solve this, the population used to compute an average speed is replaced by a nearby vehicle whose orientation angle approximately equals the orientation angle of the target vehicle. This can eliminate a noise due to a vehicle that waits for a traffic light or travels the opposite lane at the intersection. An average speed can be computed more accurately. The embodiment uses an orientation angle difference of 10 degrees between a vehicle as the population to compute an average speed and the target vehicle. The other values (e.g., 5 degrees) may be used.

The front-back direction is not limited to the straight front or rear of the target vehicle and also covers the range diagonally forward and backward. The embodiment is not limited thereto. As a more favorable mode, a vehicle traveling the same lame as the target vehicle is used as the population to compute an average speed. This enables to compute an average speed more accurately. This is because the same road may contain different lanes where vehicles travel at different speeds. To determine whether or not the same lane is traveled, the target vehicle is extended along its front-back direction to compute a line based on the vehicle position and the orientation angle of the target vehicle. A distance is found between the line and the nearby vehicle for the target vehicle. The vehicles are determined to travel the same lane if the shortest distance is within one meter. Other publicly known technologies may be used to determine whether or not the same lane is traveled.

The process results in YES at S32 and proceeds to S34 if the travel speed of the target vehicle is greater than the sum of an average speed of vehicles traveling around the target vehicle and the specified threshold value (Wth) at S32. The process results in NO at S32 and proceeds to S33 if the travel speed of the target vehicle is smaller than or equal to the sum of an average speed of vehicles traveling around the target vehicle and the specified threshold value (Wth). The process also results in NO at S32 and proceeds to S33 if no vehicle is found around the target vehicle and an average speed cannot be computed.

At S33, the process determines whether or not the orientation angle speed of the target vehicle is greater than specified threshold value Yth. According to the embodiment, threshold value Yth is set to 0.07 rad/sec (≈4 deg/sec) or may be specified otherwise. A vehicle orientation angle speed assumed to be dangerous may be found from the observation data in the past. The process results in YES at S33 and proceeds to S34 if the orientation angle speed of the target vehicle is greater than specified threshold value Yth at S33. The process results in NO at S33 and proceeds to S35 if the orientation angle speed of the target vehicle is smaller than or equal to specified threshold value Yth.

At S34, the process determines that the target vehicle is a reckless vehicle. The reckless vehicle determination process then terminates. The reckless-vehicle determination section 286 stores the identification ID for the nearby vehicle determined to be a reckless vehicle in the internal memory 282 so as to be distinguished from the identification ID of the normal vehicle. This enables to explicitly identify the reckless vehicle.

At S35, the process determines that the target vehicle is a normal vehicle. The reckless vehicle determination process then terminates. The reckless-vehicle determination section 286 stores the identification ID for the nearby vehicle determined to be a normal vehicle in the internal memory 282 so that the normal vehicle can be explicitly identified.

Figure 9:
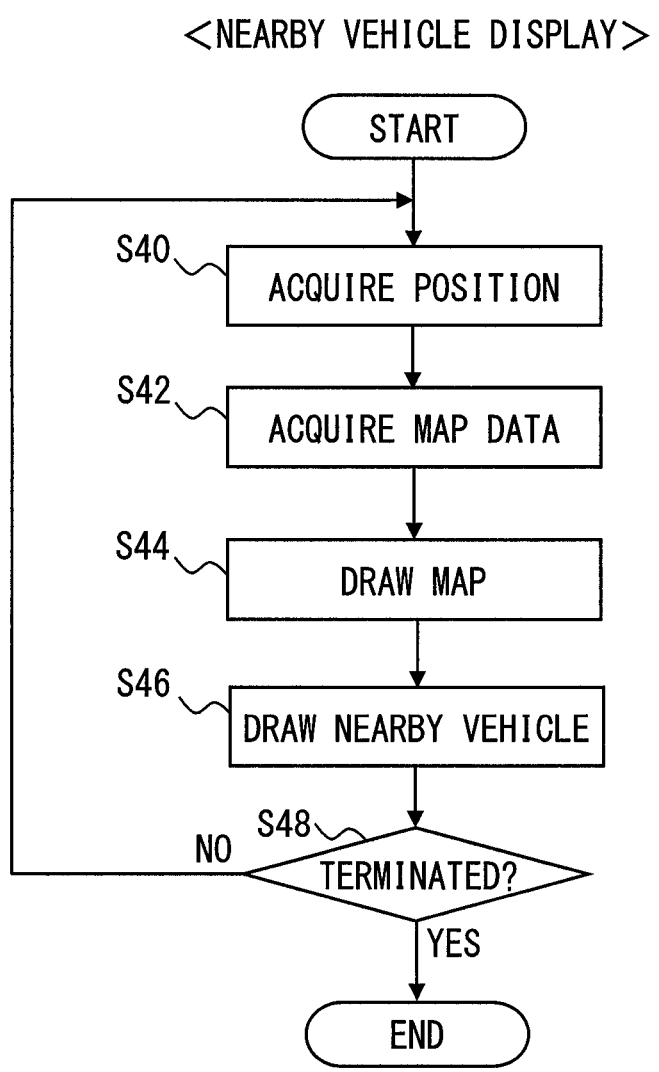
FIG. 9 is a flowchart illustrating a nearby vehicle display process.

With reference to a flowchart in FIG. 9, the following describes a nearby vehicle display process that allows the display 27 to display nearby vehicle information such as a nearby vehicle position or determination whether or not the nearby vehicle is a reckless vehicle. The flowchart in FIG. 9 starts when the communicator 3 and the portable terminal 2 are powered on.

At S40, the process performs a position acquisition process and proceeds to S42. During the position acquisition process at S40, the map image drawing section 287 reads the subject vehicle position information corresponding to the newest time stamp (namely, the most recent subject vehicle position information) from the subject vehicle position information stored in the internal memory 282.

At S42, the map image drawing section 287 performs a map data acquisition process and proceeds to S44. This map data acquisition process at S42 reads map data around the current main vehicle position from the memory 26. The range of map data read from the memory 26 depends on the current main vehicle position and the display scale predetermined for a map image.

At S44, the map image drawing section 287 performs a map image drawing process and proceeds to S46. The map image drawing process at S42 generates a map image from the map data read at S41 so that the current subject vehicle position is located approximately at the center of the screen.

At S46, the nearby vehicle display section 288 performs a nearby vehicle drawing process and proceeds to S48. During the nearby vehicle drawing process at S46, the nearby vehicle display section 288 draws a mark representing the position and the orientation angle identified by the vehicle identification section 285 for each nearby vehicle. The mark is drawn so as to overlap with the map image generated at S46. A nearby vehicle determined to be a reckless vehicle is displayed with a mark whose display mode such as color or shape differs from that of a normal vehicle.

The nearby vehicle display process terminates the flow if the nearby vehicle display process reaches termination timing at S48 (S46 YES). The nearby vehicle display process returns to S40 and repeats the flow (to successively update images) if the nearby vehicle display process does not reach the termination timing (S46 NO). An example of the timing to terminate the nearby vehicle display process is to disconnect the portable terminal 2 from the communicator 3 or to power off the communicator 3.

Figure 10:
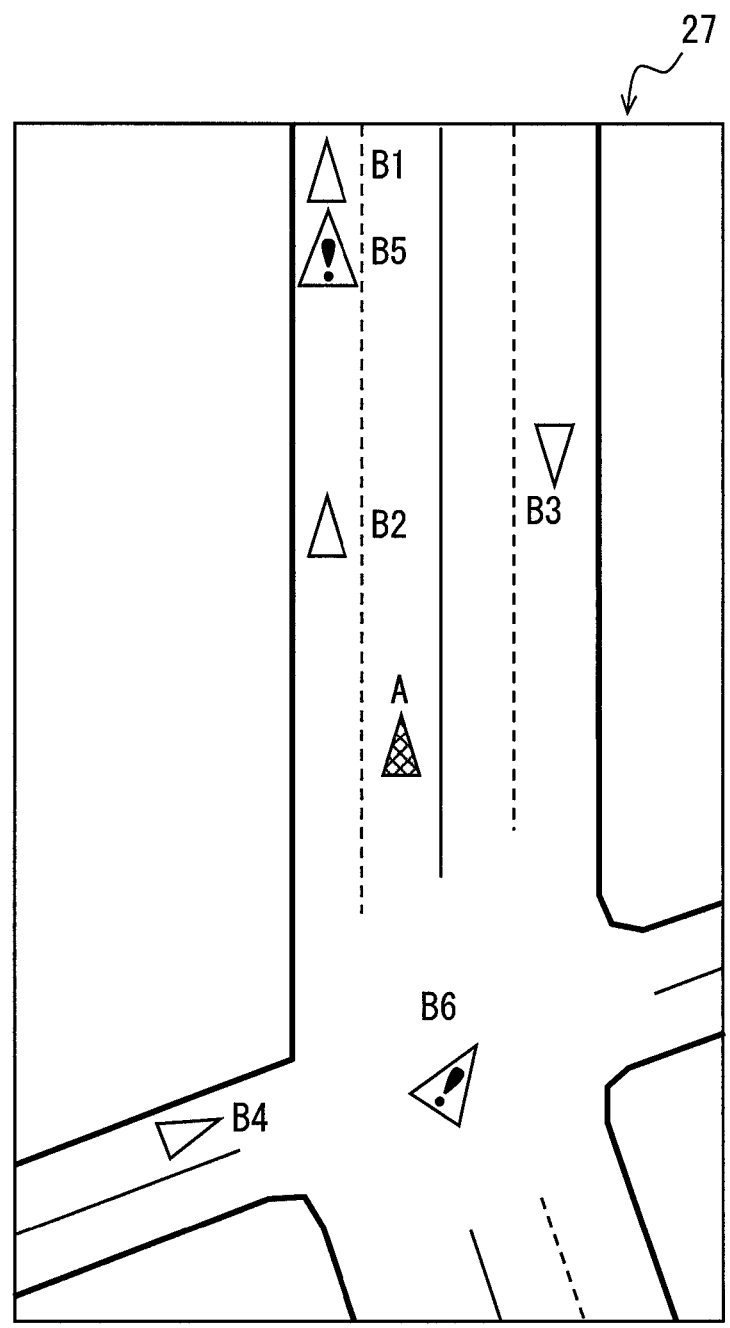
FIG. 10 illustrates an example of a display screen.

FIG. 10 illustrates a display screen of the display 27 where the processes are performed. Reference symbol A in FIG. 10 represents a subject vehicle. Reference symbols B1 through B6 represent nearby vehicles for the subject vehicle. Each of A and B1 through B6 includes the reckless-vehicle reporting apparatus 1 that is present within a range capable of wireless communication with the communicator 3. The example uses normal vehicles B1 through B4 and reckless vehicles B5 and B6.

Nearby vehicle B5 excessively approaches normal vehicle B1 and causes sudden braking. The process results in YES at S30 of the flowchart in FIG. 8 and nearby vehicle B5 is therefore assumed to be a reckless vehicle. Nearby vehicle B6 turns in the intersection while the deceleration is insufficient. The orientation angle speed exceeds threshold value Yth and the process results in YES at S33.

As illustrated in FIG. 10, normal vehicles B1 through B4 are represented as isosceles triangles. The vehicles travel in the direction toward an apex of the isosceles triangle. The orientation of the isosceles triangle represents the orientation angle of the vehicle. The marks representing normal vehicles B1 through B4 are displayed in gray, for example.

Subject vehicle A is located near the center (slightly downward from the center) of the screen. Subject vehicle A is displayed with a mark different from the normal vehicle and the reckless vehicle so as to be distinguishable from the nearby vehicle. The subject vehicle can be displayed in blue, for example. Reckless vehicles B5 and B6 are represented as isosceles triangles colored in yellow, orange, or red so as to be identified at a glance. An exclamation mark may be displayed inside. The embodiment uses an isosceles triangle as the mark to indicate the vehicle's position and orientation angle. Graphics such as an arrow may be also used.

Viewing the screen as illustrated in FIG. 10, a driver of subject vehicle A can recognize at a glance whether or not the nearby vehicle indicates reckless driving. Suppose that the nearby vehicle traveling ahead of the subject vehicle is a reckless vehicle. The driver can take action such as keeping an inter-vehicular distance longer than usual and can be aware of safer driving.

The embodiment provides the following operations and effects. According to the configuration, a different vehicle transmits the determination information about the different vehicle itself. The portable terminal 2 determines whether or not the different vehicle (reckless vehicle) indicates reckless driving. The reckless vehicle is displayed in the display mode that differs from the other non-reckless vehicles. Viewing the display, the driver of the subject vehicle can recognize whether or not the different vehicle traveling around indicates reckless driving. The driver of the subject vehicle can be notified whether or not the nearby vehicle indicates reckless driving.

According to the embodiment, the subject vehicle determines whether or not the nearby vehicle is a reckless vehicle. Further, the nearby vehicle as a transmission side may determine whether or not the nearby vehicle itself is a reckless vehicle. The nearby vehicle may transmit a determination result to the subject vehicle. However, the subject vehicle is uncertain about criteria (various threshold values described above) to determine a reckless vehicle when the transmission side itself determines whether or not it is a reckless vehicle. This may degrade reliability of a determination result transmitted from the nearby vehicle.

According to the embodiment, however, the subject vehicle as a reception side determines whether or not the nearby vehicle is a reckless vehicle. This can improve reliability of determining whether or not the nearby vehicle is a reckless vehicle. The driver of the subject vehicle may be able to configure various threshold values (Ath, Vth, Wth, and Yth) used to determine whether or not a different vehicle indicates reckless driving. This enables to determine reckless vehicles according to the driver's preference.

The inter-vehicle communication uses a finite region. A communication region may be insufficient due to transmission of a determination result as well as the vehicle information such as acceleration. However, the inter-vehicle communication previously ensures a region used for the vehicle information such as acceleration. There is no need to worry about insufficiency of the communication region. According to the embodiment, the nearby vehicle transmits its vehicle information. The subject vehicle as the reception side determines whether or not the nearby vehicle is a reckless vehicle. This enables to more efficiently use the communication region and more smoothly actuate the embodiment.

According to the embodiment, the reckless vehicle determination process at S32 in FIG. 8 determines whether or not the target vehicle is a reckless vehicle, based on comparison between a travel speed of the target vehicle and an average value (average speed) of travel speeds of the other nearby vehicles traveling around the target vehicle. However, the configuration is not limited thereto. Other statistic criteria may be used to determine whether or not the target vehicle is a reckless vehicle. An example is the normal distribution whose population uses travel speeds of other nearby vehicles traveling around the target vehicle. The target vehicle may be determined to be a reckless vehicle if a travel speed of the target vehicle exceeds a range between $-1\sigma$ and $+1\sigma$.

(First Modification)

The embodiment classifies nearby vehicles into two grades such as a normal vehicle and a reckless vehicle. However, the configuration is not limited thereto. The extent of recklessness differs between reckless vehicles depending on whether a nearby vehicle travels 10 km/h or 30 km/h higher than threshold value Vth used to determine reckless driving operation based on travel speeds. Threshold value Vth for travel speeds may be classified into more grades. The extent of recklessness may be evaluated based on several grades.

The reckless vehicle display section 288A favorably uses different display modes corresponding to the extent of recklessness for a nearby vehicle when several grades are used to determine the extent of recklessness for reckless vehicle. When the extent of recklessness is greater, the display mode may enable the display to be colored in more vivid red or cause blinking at shorter intervals to be more apparent to a subject vehicle driver. When the extent of recklessness is lesser, the display mode may enable the display to be more approximate to a normal vehicle. The extent of recklessness for reckless vehicle may be decreased as time proceeds. The nearby vehicle display section 288 may approximate the display mode to a normal vehicle mark according to the extent of recklessness. The modification evaluates the extent of recklessness in terms of travel speeds based on several grades. Further, the extent of recklessness may be similarly evaluated using grades of threshold values in terms of accelerations or orientation angle speeds.

(Second Modification)

The reckless-vehicle determination section 286 may use the vehicle information about the subject vehicle to determine whether or not the subject vehicle itself is a reckless vehicle. The reckless vehicle display section 288A accordingly displays the display mode for an icon representing the subject vehicle so that the subject vehicle is identified as a reckless vehicle. The subject vehicle driver can be aware of how the subject vehicle is identified from a nearby vehicle. The subject vehicle driver can develop an awareness of safe driving.

(Third Modification)

Chronological data about a nearby vehicle such as changes in the orientation angle speed or the orientation may be used by the reckless-vehicle determination section 286 to determine whether or not the nearby vehicle (or a target vehicle) is driven in a zigzag. Zigzag driving can be determined when the orientation angle speed (or the orientation angle) oscillates over a specified width in a different direction within a specified time period. The shape of a road the target vehicle travels may be acquired from map data. In such a case, zigzag driving may be determined based on whether or not the target vehicle appropriately varies the orientation angle speed according to the road shape. In this modification, the reckless vehicle display section 288A may display the target vehicle driven in zigzag using a display mode that differs from the mode for normal vehicles and the mode for the other reckless vehicles.

According to the embodiment, map data is stored in the memory 26. However, the configuration is not limited thereto. Necessary map data may be acquired by accessing an external server (unshown) if the portable terminal 2 can use a mobile telephone line. The program 4 may be stored in an external server.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A reckless-vehicle reporting apparatus in a vehicle, the reckless-vehicle reporting apparatus wirelessly communicating data with a different reckless-vehicle reporting apparatus in each of a plurality of different vehicles different from the vehicle, the different reckless-vehicle reporting apparatus being identical to the reckless-vehicle reporting apparatus in function, the reckless-vehicle reporting apparatus, executed on a processor, comprising:
a position detection unit that detects a position of the vehicle;
an in-vehicle communicator that transmits a position data indicating a position of the vehicle and receives a position data indicating a position of each of the different vehicles;
a mark display processor that displays a mark indicating the position of each of the different vehicles on a display based on the received position data of each of the different vehicles;
a determination information acquisition section that acquires determination information that is used to determine whether a reckless driving operation takes place in the vehicle or not;
a transmission control section that transmits the determination information acquired by the determination information acquisition section via the in-vehicle communicator;
a reception control section that receives determination information from each of the different vehicles via the in-vehicle communicator, the determination information received from each of the different vehicles being used to determine whether a reckless driving operation takes place in each of the different vehicles or not;
a reckless-vehicle determination section that determines whether a reckless driving operation takes place in each of the different vehicles based on the determination information of each of the different vehicles received by the reception control section; and
a reckless-vehicle display processor that displays the mark indicating the position of a target different vehicle in a first display mode, the target different vehicle being the different vehicle in which the reckless driving operation is determined to take place by the reckless-vehicle determination section, the first display mode being different from a second display mode that is used to the mark indicating the position of each of the different vehicles in which the reckless driving operation is not determined to take place,
wherein:
the determination information acquisition section includes a travel speed acquisition unit that acquires a travel speed of the vehicle;
the determination information contains a travel speed acquired by the travel speed acquisition unit; and
the reckless-vehicle determination section determines that the reckless driving operation takes place in the target different vehicle when a travel speed of the target different vehicle is greater than a value that is obtained by adding a predetermined threshold value to an average travel speed of several nearby different vehicles among the plurality of different vehicles traveling adjacent to the target different vehicle.

2. The reckless-vehicle reporting apparatus according to claim 1, further comprising:
a portable terminal including the display and a computer, the computer operating as the determination information acquisition section, the transmission control section, the reception control section, the mark display processor, the reckless-vehicle determination section, and the reckless-vehicle display processor,
wherein the in-vehicle communicator includes a first different communication unit while the portable terminal includes a second different communication unit that communicates with the first different communication unit.

3. The reckless-vehicle reporting apparatus according to claim 1, wherein:
the determination information acquisition section includes an acceleration acquisition unit that acquires an acceleration that is applied to the vehicle;
the determination information contains an acceleration acquired by the acceleration acquisition unit; and
the reckless-vehicle determination section determines that the reckless driving operation takes place in the target different vehicle when an acceleration of the target different vehicle is greater than a predetermined threshold value.

4. The reckless-vehicle reporting apparatus according to claim 1, wherein
the reckless-vehicle determination section determines that the reckless driving operation takes place in the target different vehicle when a travel speed of the target different vehicle is greater than a predetermined threshold value.

5. The reckless-vehicle reporting apparatus according to claim 1, wherein
each of the nearby different vehicles used for obtaining the average travel speed
exists within a predetermined distance from the target different vehicle and
has an orientation angle difference with the target different vehicle, the orientation angle difference being less than a predetermined value.

6. The reckless-vehicle reporting apparatus according to claim 1, wherein:
the determination information acquisition section includes an orientation angle speed acquisition unit that acquires an orientation angle speed of the vehicle;
the determination information contains an orientation angle speed acquired by the orientation angle speed acquisition unit; and
the reckless-vehicle determination section determines that the reckless driving operation takes place in the target different vehicle when an orientation angle speed of the target different vehicle is greater than a predetermined threshold value.

7. The reckless-vehicle reporting apparatus according to claim 3, wherein
the threshold value used by the reckless-vehicle determination section to determine whether the reckless driving operation takes place is enabled to be changed by a driver of the vehicle.

8. The reckless-vehicle reporting apparatus according to claim 1 wherein:
the reckless-vehicle determination section determines whether the reckless driving operation takes place in a plurality of reckless stages by using a plurality of predetermined threshold values; and
the reckless-vehicle display processor displays the mark in a display mode that is changed depending on determined one of the plurality of reckless stages.

9. The reckless-vehicle reporting apparatus according to claim 1, wherein:
the reckless-vehicle determination section determines whether a reckless driving operation takes place in the vehicle based on the determination information of the vehicle; and
the reckless-vehicle display processor indicates on the display that the reckless driving operation takes place in the vehicle when it is determined that the reckless driving operation takes place in the vehicle.

10. The reckless-vehicle reporting apparatus according to claim 1, further comprising:
a recklessness determination continuation section,
wherein as long as receiving the determination information from the target different vehicle in which the reckless driving operation was once determined to take place, the recklessness determination continuation section maintains the determining that the reckless driving operation takes place in the target different vehicle.

11. The reckless-vehicle reporting apparatus according to claim 1, wherein
when a first mark being the mark indicating the position of the target different vehicle in which the reckless driving operation is determined to take place is overlapped with a second mark being the mark indicating the position of one of the different vehicles in which the reckless driving operation is not determined to take place, the reckless-vehicle display processor displays the first mark and the second mark on the display such that the first mark is closer to a driver of the vehicle than the second mark.

12. A program product stored in a non-transitory computer-readable medium, the product comprising instructions to cause a computer to function as a reckless-vehicle reporting apparatus in a vehicle, the reckless-vehicle reporting apparatus wirelessly communicating data with a different reckless-vehicle reporting apparatus in each of a plurality of different vehicles different from the vehicle, the different reckless-vehicle reporting apparatus being identical to the reckless-vehicle reporting apparatus in function,
the reckless-vehicle reporting apparatus, executed on a processor, comprising:
a position detection unit that detects a position of the vehicle;
an in-vehicle communicator that transmits a position data indicating a position of the vehicle and receives a position data indicating a position of each of the different vehicles;
a mark display processor that displays a mark indicating the position of each of the different vehicles on a display based on the received position data of each of the different vehicles;
a determination information acquisition section that acquires determination information that is used to determine whether a reckless driving operation takes place in the vehicle or not;
a transmission control section that transmits the determination information acquired by the determination information acquisition section via the in-vehicle communicator;
a reception control section that receives determination information from each of the different vehicles via the in-vehicle communicator, the determination information received from each of the different vehicles being used to determine whether a reckless driving operation takes place in each of the different vehicles or not;
a reckless-vehicle determination section that determines whether a reckless driving operation takes place in each of the different vehicles based on the determination information of each of the different vehicles received by the reception control section; and
a reckless-vehicle display processor that displays the mark indicating the position of a target different vehicle in a first display mode, the target different vehicle being the different vehicle in which the reckless driving operation is determined to take place by the reckless-vehicle determination section, the first display mode being different from a second display mode that is used to the mark indicating the position of each of the different vehicles in which the reckless driving operation is not determined to take place,
wherein:
the determination information acquisition section includes a travel speed acquisition unit that acquires a travel speed of the vehicle;
the determination information contains a travel speed acquired by the travel speed acquisition unit; and
the reckless-vehicle determination section determines that the reckless driving operation takes place in the target different vehicle when a travel speed of the target different vehicle is greater than a value that is obtained by adding a predetermined threshold value to an average travel speed of several nearby different vehicles among the plurality of different vehicles traveling adjacent to the target different vehicle.

13. A reckless-vehicle reporting apparatus in a vehicle, the reckless-vehicle reporting apparatus wirelessly communicating data with a different reckless-vehicle reporting apparatus in each of a plurality of different vehicles different from the vehicle, the different reckless-vehicle reporting apparatus being identical to the reckless-vehicle reporting apparatus in function,
the reckless-vehicle reporting apparatus, executed on a processor, comprising:
a position detection unit that detects a position of the vehicle;
an in-vehicle communicator that transmits a position data indicating a position of the vehicle and receives a position data indicating a position of each of the different vehicles;
a mark display processor that displays a mark indicating the position of each of the different vehicles on a display based on the received position data of each of the different vehicles;
a determination information acquisition section that acquires determination information that is used to determine whether a reckless driving operation takes place in the vehicle or not;
a transmission control section that transmits the determination information acquired by the determination information acquisition section via the in-vehicle communicator;
a reception control section that receives determination information from each of the different vehicles via the in-vehicle communicator, the determination information received from each of the different vehicles being used to determine whether a reckless driving operation takes place in each of the different vehicles or not;
a reckless-vehicle determination section that determines whether a reckless driving operation takes place in each of the different vehicles based on the determination information of each of the different vehicles received by the reception control section;

a reckless-vehicle display processor that displays the mark indicating the position of a target different vehicle in a first display mode, the target different vehicle being the different vehicle in which the reckless driving operation is determined to take place by the reckless-vehicle determination section, the first display mode being different from a second display mode that is used to the mark indicating the position of each of the different vehicles in which the reckless driving operation is not determined to take place; and a recklessness determination continuation section, wherein as long as receiving the determination information from the target different vehicle in which the reckless driving operation was once determined to take place, the recklessness determination continuation section maintains the determining that the reckless driving operation takes place in the target different vehicle.

14. The reckless-vehicle reporting apparatus according to claim 13, further comprising:
a portable terminal including the display and a computer, the computer operating as the determination information acquisition section, the transmission control section, the reception control section, the mark display processor, the reckless-vehicle determination section, and the reckless-vehicle display processor,
wherein the in-vehicle communicator includes a first different communication unit while the portable terminal includes a second different communication unit that communicates with the first different communication unit.

15. The reckless-vehicle reporting apparatus according to claim 13, wherein:
the determination information acquisition section includes an acceleration acquisition unit that acquires an acceleration that is applied to the vehicle;
the determination information contains an acceleration acquired by the acceleration acquisition unit; and
the reckless-vehicle determination section determines that the reckless driving operation takes place in the target different vehicle when an acceleration of the target different vehicle is greater than a predetermined threshold value.

16. The reckless-vehicle reporting apparatus according to claim 13, wherein:
the determination information acquisition section includes a travel speed acquisition unit that acquires a travel speed of the vehicle;
the determination information contains a travel speed acquired by the travel speed acquisition unit; and
the reckless-vehicle determination section determines that the reckless driving operation takes place in the target different vehicle when a travel speed of the target different vehicle is greater than a predetermined threshold value.

17. The reckless-vehicle reporting apparatus according to claim 13, wherein:
the determination information acquisition section includes a travel speed acquisition unit that acquires a travel speed of the vehicle;
the determination information contains a travel speed acquired by the travel speed acquisition unit; and
the reckless-vehicle determination section determines that the reckless driving operation takes place in the target different vehicle when a travel speed of the target different vehicle is greater than a value that is obtained by adding a predetermined threshold value to an average travel speed of several nearby different vehicles among the plurality of different vehicles traveling adjacent to the target different vehicle.

18. The reckless-vehicle reporting apparatus according to claim 17, wherein
each of the nearby different vehicles used for obtaining the average travel speed
exists within a predetermined distance from the target different vehicle and
has an orientation angle difference with the target different vehicle, the orientation angle difference being less than a predetermined value.

19. The reckless-vehicle reporting apparatus according to claim 13, wherein:
the determination information acquisition section includes an orientation angle speed acquisition unit that acquires an orientation angle speed of the vehicle;
the determination information contains an orientation angle speed acquired by the orientation angle speed acquisition unit; and
the reckless-vehicle determination section determines that the reckless driving operation takes place in the target different vehicle when an orientation angle speed of the target different vehicle is greater than a predetermined threshold value.

20. The reckless-vehicle reporting apparatus according to claim 15, wherein
the threshold value used by the reckless-vehicle determination section to determine whether the reckless driving operation takes place is enabled to be changed by a driver of the vehicle.

21. The reckless-vehicle reporting apparatus according to claim 13, wherein:
the reckless-vehicle determination section determines whether the reckless driving operation takes place in a plurality of reckless stages by using a plurality of predetermined threshold values; and
the reckless-vehicle display processor displays the mark in a display mode that is changed depending on determined one of the plurality of reckless stages.

22. The reckless-vehicle reporting apparatus according to claim 13, wherein:
the reckless-vehicle determination section determines whether a reckless driving operation takes place in the vehicle based on the determination information of the vehicle; and
the reckless-vehicle display processor indicates on the display that the reckless driving operation takes place in the vehicle when it is determined that the reckless driving operation takes place in the vehicle.

23. The reckless-vehicle reporting apparatus according to claim 13, wherein
when a first mark being the mark indicating the position of the target different vehicle in which the reckless driving operation is determined to take place is overlapped with a second mark being the mark indicating the position of one of the different vehicles in which the reckless driving operation is not determined to take place, the reckless-vehicle display processor displays the first mark and the second mark on the display such that the first mark is closer to a driver of the vehicle than the second mark.

24. A program product stored in a non-transitory computer-readable medium, the product comprising instructions to cause a computer to function as a reckless-vehicle reporting apparatus in a vehicle, the reckless-vehicle reporting apparatus wirelessly communicating data with a different reckless-vehicle reporting apparatus in each of a plurality of different vehicles different from the vehicle, the different reckless-vehicle reporting apparatus being identical to the reckless-vehicle reporting apparatus in function, the reckless-vehicle reporting apparatus, executed on a processor, comprising:
    a position detection unit that detects a position of the vehicle;
    an in-vehicle communicator that transmits a position data indicating a position of the vehicle and receives a position data indicating a position of each of the different vehicles;
    a mark display processor that displays a mark indicating the position of each of the different vehicles on a display based on the received position data of each of the different vehicles;
    a determination information acquisition section that acquires determination information that is used to determine whether a reckless driving operation takes place in the vehicle or not;
    a transmission control section that transmits the determination information acquired by the determination information acquisition section via the in-vehicle communicator;
    a reception control section that receives determination information from each of the different vehicles via the in-vehicle communicator, the determination information received from each of the different vehicles being used to determine whether a reckless driving operation takes place in each of the different vehicles or not;
    a reckless-vehicle determination section that determines whether a reckless driving operation takes place in each of the different vehicles based on the determination information of each of the different vehicles received by the reception control section;
    a reckless-vehicle display processor that displays the mark indicating the position of a target different vehicle in a first display mode, the target different vehicle being the different vehicle in which the reckless driving operation is determined to take place by the reckless-vehicle determination section, the first display mode being different from a second display mode that is used to the mark indicating the position of each of the different vehicles in which the reckless driving operation is not determined to take place; and
    a recklessness determination continuation section,
wherein as long as receiving the determination information from the target different vehicle in which the reckless driving operation was once determined to take place, the recklessness determination continuation section maintains the determining that the reckless driving operation takes place in the target different vehicle.

\* \* \* \* \*